United States Patent [19]

Yamamitsu et al.

[11] 4,209,800
[45] Jun. 24, 1980

[54] MAGNETIC COLOR VIDEO RECORDING AND REPRODUCING SYSTEM WITH COLOR KILLER CIRCUIT

[75] Inventors: Chojuro Yamamitsu, Kawanishi; Sadafumi Kitamura, Neyagawa; Akira Miyamoto, Kyoto, all of Japan

[73] Assignee: Matsushita Electric Industrial Co., Ltd., Osaka, Japan

[21] Appl. No.: 921,718

[22] Filed: Jul. 3, 1978

[30] Foreign Application Priority Data

Jul. 7, 1977 [JP] Japan .................................. 52-81846

[51] Int. Cl.$^2$ ............................................ H04N 5/795
[52] U.S. Cl. ............................................ 358/8; 358/4; 358/26
[58] Field of Search .................... 360/33, 36, 26, 28, 360/30; 358/127, 8, 4, 26

[56] References Cited

U.S. PATENT DOCUMENTS

| | | | |
|---|---|---|---|
| 3,697,673 | 10/1972 | Dann | 360/36 |
| 3,772,461 | 11/1973 | Horaguchi | 358/26 |
| 3,947,871 | 3/1976 | Amari | 358/8 |
| 3,975,759 | 8/1976 | Taniguchi | 358/26 |

*Primary Examiner*—Bernard Konick
*Assistant Examiner*—Alan Faber

*Attorney, Agent, or Firm*—Stevens, Davis, Miller & Mosher

[57] ABSTRACT

A magnetic video recording and reproducing system in which a luminescence signal of a color television signal is frequency-modulated and a carrier chrominance signal is frequency-converted to a lower frequency side is disclosed, wherein during recording operation a burst signal of an input carrier chrominance signal is phase-compared with a signal from a variable frequency oscillator to produce an error signal which is used to control the variable frequency oscillator, and during playback operation a burst signal of a reproduced carrier chrominance signal is phase-compared with an output signal from a fixed frequency oscillator to produce an error signal which is used to control the variable frequency oscillator. During the recording operation, the burst signal of the input carrier chrominance signal and the signal from the variable frequency oscillator are applied as input to the detection circuit and during the playback operation the burst signal of the reproduced carrier chrominance signal and the signal from the fixed frequency oscillator are applied as inputs to the detecting circuit, to produce a phase-detected output which is used as a control signal for a color killer in order to assure a stable and reliable color killer operation with a low cost.

11 Claims, 11 Drawing Figures

MAGNETIC COLOR VIDEO RECORDING AND REPRODUCING SYSTEM WITH COLOR KILLER CIRCUIT

BACKGROUND OF THE INVENTION

The present invention relates to a magnetic video recording and reproducing system (VTR), and more particularly to a color killer circuit thereof.

A color killer circuit has been well known which detects the presence or absence of a burst signal in a video signal to deactivate a color signal processing circuit and expand a pass band of a luminescence signal processing circuit when a monochromatic video signal is to be recorded or reproduced in order to assure high fidelity recording and reproduction of monochromatic and color video signals.

Heretofore, the color killer circuit in the magnetic video recording and reproducing system (VTR) usually detects a level of the burst signal in the carrier chrominance signal, rectifies it to produce a d.c. voltage which is compared with a threshold level to produce a LOW output or HIGH output, which is used to control the color killer operation. Such a prior art color killer circuit, however, has problems in that the burst level changes depending on a variance of the levels of the burst signals transmitted from different broadcasting stations or by a distortion in a transmitted electromagnetic wave and that the color killer circuit operates improperly due to the influence of noise in a weak electric field strength region such that the monochromatic signal is erroneously determined as the color signal or vice versa. It has a further problem in that because of a difference between the threshold level of the color killer circuit in the recording system and that in the reproducing system in the VTR or a difference between the sensitivities of video heads, the color signal recorded is reproduced as a monochromatic signal if the burst level is low.

SUMMARY OF THE INVENTION

It is, therefore, a first object of the present invention to provide a magnetic video recording and reproducing system which provides a stable color killer operation.

It is a second object of the present invention to provide a magnetic video recording and reproducing system in which, during the recording operation, the carrier chrominance signal is frequency-converted to a lower frequency side of a frequency modulated luminescence signal and during the playback operation the low frequency-converted carrier chrominance signal is frequency-converted to the original carrier chrominance signal by a frequency converter, and a common automatic phase control (APC) circuit which produces a carrier wave which is in phase-synchronism with the burst signal of the reproduced carrier chrominance signal and a common chrominance signal processing circuit are used for both recording and playback operations to enable low cost design of the system and assure a stable and reliable color killer operation.

According to the magnetic video recording and reproducing system of the present invention, an APC circuit is provided, which, during the recording operation, phase-compares the burst signal of the input video signal to be recorded with a signal from a variable frequency oscillator to produce a comparison output which is used to control the oscillation frequency of the variable frequency oscillator, and, during the playback operation, phase-compares the burst signal of the reproduced carrier chrominance signal with an output signal from a fixed frequency oscillator to produce a comparison output which is used to control the oscillation frequency of the variable frequency oscillator, and a phase detection circuit is provided, which, during the recording operation, frequency-converts the carrier chrominance signal in the input video signal to a lower frequency band by a signal associated with the output of the variable frequeny oscillator and, during the playback operation, frequency-converts the reproduced low frequency carrier chrominance signal to the original frequency signal and which has a different detection axis from that of the phase comparator. During the recording operation, the burst signal and the output of the variable frequency oscillator are applied to the input of the phase detection circuit and during the playback operation the reproduced burst signal and the output of the fixed frequency oscillators are applied to the input of the phase detection circuit, to produce a phase detection output from which a color killer signal is produced. In order to assure that a predetermined color killer signal is produced during the recording mode and the playback mode, the phase of one of the two inputs to the phase detection circuit is changed by 180° from the recording mode to the playback mode. Alternatively, the polarity of the output of the phase detection circuit may be reversed from the recording mode to the playback mode to attain the same effect.

According to the present invention, the color killer signal can be produced by the single color killer circuit which includes the APC circuit which is used for frequency conversion in common to the recording mode and the playback mode. Accordingly, the erroneous operation due to the variation in the level of the burst signal or the influence by the noise is avoided and the difference between the threshold levels in the recording mode and the playback mode is not included. Therefore, a stable color killer operation is assured.

DETAILED DESCRIPTION OF THE PREFERRED EMBODIMENTS

Figure 1:
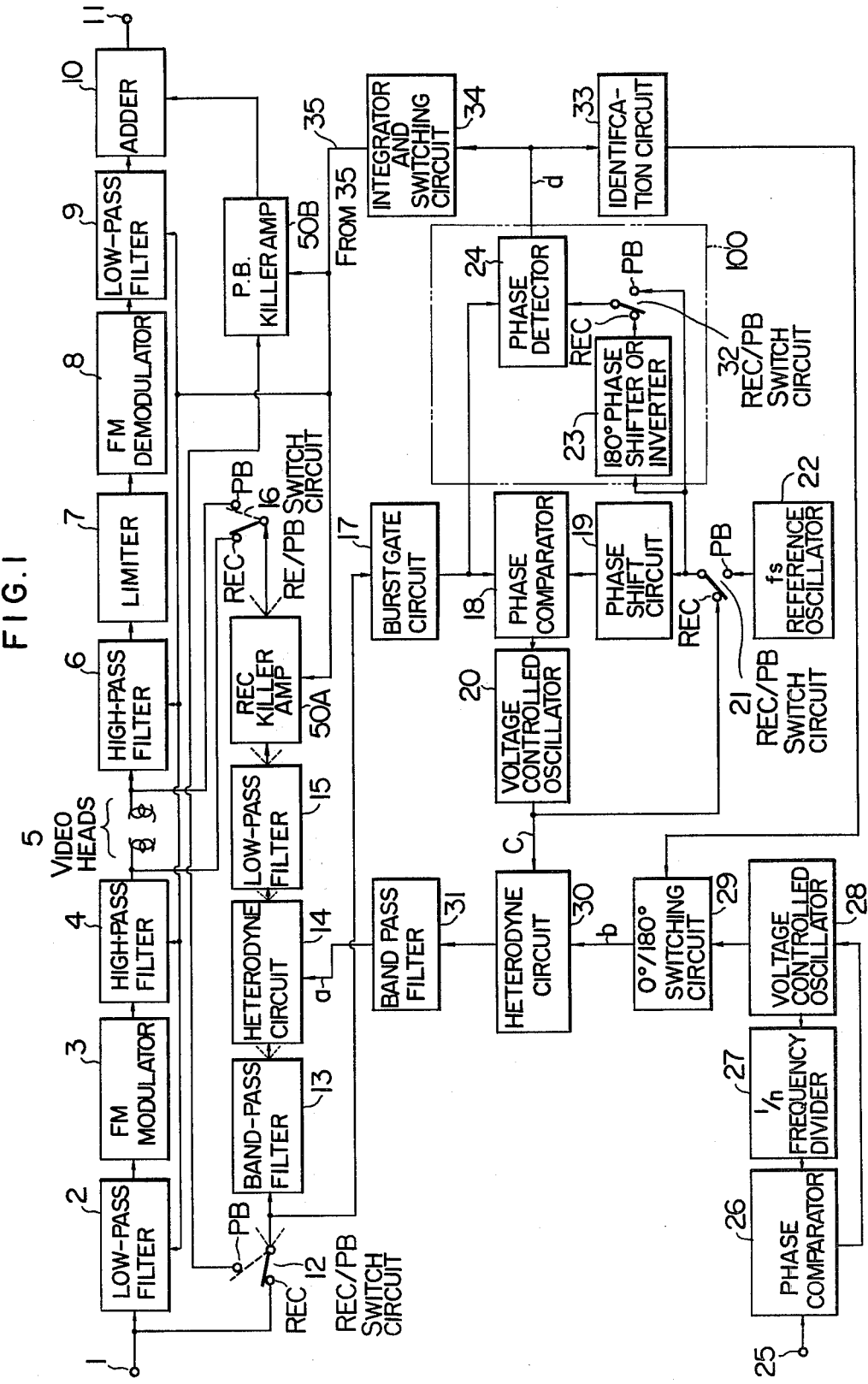
FIG. 1 is a block diagram illustrating one embodiment of a magnetic video recording and reproducing system of the present invention.

Referring to FIG. 1, a color television signal from a video input terminal is applied to a low-pass filter 2 to separate a luminescence signal, which is frequency-modulated by a frequency modulator 3 and then passed through a high-pass filter 4 to eliminate a low frequency-converted chrominance signal component to be recorded. A low frequency-converted chrominance signal which is derived from a color signal processing circuit to be described later is superimposed on the output signal from the high-pass filter 4, the output signal of which is recorded by a video head 5 on a record medium. In the playback operation, a signal read from the video head 5 is passed through a high-pass filter 6 to produce a frequency-modulated wave, which is applied to a limiter 7 to remove amplitude variation. The resulting signal is passed through a frequency demodulator 8 and a low-pass filter 9 to produce a video signal, to which a reproduced chrominance signal (frequency $f_s = 3.58$ MHz) is added to an adder 10 to produce a video signal output at a reproduced video signal output terminal 11.

On the other hand, during the recording operation, the color television signal is applied to a band-pass filter 13 through a record/playback switch circuit 12 to produce the carrier chrominance signal of the frequency $f_s = 3.58$ MHz, which signal is frequency-converted to a lower frequency band by a carrier (continuous wave) a to be described later by a frequency converter (heterodyne circuit) 14. The output signal of the frequency converter 14 is passed through a low-pass filter 15 to eliminate sprious components, and the output signal of the low-pass filter 15 is passed through a killer amplifier 50A, a record/playback switch circuit 16 and combined with the frequency-modulated luminescence signal derived from the luminescence signal processing circuit described above. The combined signal is then recorded on the record medium by the video head 5. During the playback operation, the signal reproduced by the video head 5 is applied to the low-pass filter 15 through the record/playback switch circuit 16 to extract the low frequency carrier chrominance signal, which is frequency-converted by the carrier a in the frequency converter (heterodyne circuit) 14, the output signal of which is passed through the band-pass filter 13 to reproduce the original carrier chrominance signal of the sub-carrier frequency $f_s$. The reproduced carrier chrominance signal is passed through the record/playback switch circuit 12 and a killer amplifier 50B to the adder 10 to produce a chrominance signal output. The record/playback switch circuit 12 functions to pass the input video signal to the band-pass filter 13 during the recording operation and pass the carrier chrominance signal output from the band-pass filter 13 to the adder 10 through the killer amplifier 50B during the playback operation. The record/playback switch circuit 16 functions to connect the low-pass filter 15 to the video head 5 through the killer amplifier 50A during the recording operation and connect the video head 5 to the low-pass filter 15 during the playback operation.

The generation of the carrier a is now explained. A horizontal sync. signal from a horizontal sync. signal input terminal 25 is phase-compared in a phase comparator 26 with a 1/n frequency-divided signal of an output from a variable frequency oscillator (voltage controlled oscillator) 28, which signal was frequency-divided by a 1/n frequency divider 27, and a resulting error signal is used to control the variable frequency oscillator (voltage controlled oscillator) 28. Those circuits constitute an AFC circuit (which produces a continuous wave which is phase-synchronized with the horizontal sync. signal). The output of the variable frequency oscillator (voltage controlled oscillator) 28 is passed through a 0°/180° switching circuit 29 to produce a continuous wave b.

On the other hand, a burst gate circuit 17 gates a burst signal in the input video signal during the recording operation and gates a burst signal in the reproduced carrier chrominance signal which is derived from the bandpass filter 13 during the playback operation. This burst signal is applied to a phase comparator 18 and a phase detector 24. During the recording operation, a reference signal which was derived by passing an output of a variable frequency oscillator (voltage controlled oscillator) 20 of a frequency $f_s$ through a record/playback switch 21 and a phase shifter 19 having an appropriate amount of phase shift (a 90° leading phase circuit in the illustrated embodiment) is phase-compared with the burst signal in the phase comparator 18 to produce an error signal, which is used to control the variable frequency oscillator (voltage controlled oscillator) 20. Those circuits constitute an APC circuit. When the burst signal has a frequency of $f_s + \Delta f_s$ (where $\Delta f_s$ is a frequency variation), the output of the variable frequency oscillator (voltage controlled oscillator) 20 also has a frequency of $f_s + \Delta f_s$. That is, the output is in phase-synchronism with the input burst signal. During the playback operation, a reference signal derived by passing an output of a fixed frequency oscillator (reference oscillator) 22 having a stable frequency $f_s$ through the record/playback switch circuit 21 and the phase shifter 19 having the appropriate amount of phase shift (e.g. the 90° leading phase circuit) is phase-compared with the burst signal in the phase comparator 18 to produce an error signal, which is used to control the variable frequency oscillator (voltage controlled oscillator) 20. A continuous wave c of the frequency $f_s$ from the output of the variable frequency oscillator (voltage controlled oscillator) 20 and the continuous wave b of the frequency $f_c$ are frequency-converted by a frequency converter (heterodyne circuit) 30, the output of which is passed through a band-pass filter 31 to produce a signal having a frequency $f_s + f_c$, which signal, that is, the carrier a is applied to the frequency converter (heterodyne circuit) 14.

In the present embodiment, in order to eliminate crosstalk from adjacent tracks, the phases of the carrier chrominance signals in adjacent recording tracks are changed so that they are frequency-interleaved in association with a line cycle period and the reproduced carrier chrominance signal is passed through a comb filter in the playback mode. For example, in the recording mode, the phases of the carrier chrominance signals lead by 90° for the odd-numbered fields and lag by 90° for the even-numbered fields. This phase selection may be carried out between the variable frequency oscillator (voltage controlled oscillator) 28 and the 0°/180° switching circuit 29. The 0°/180° switching circuit 29 further functions to compensate for 180° discontinuity of the phase of the burst signal due to the affect by dropouts or noise or non-coincidence between the recording phase and the reproducing phase. When the discontinuity of the phase of the burst signal occurs due to skew or the like, it instantaneously compensates for the phase to stabilize the operation of the color killer circuit.

Figure 2:
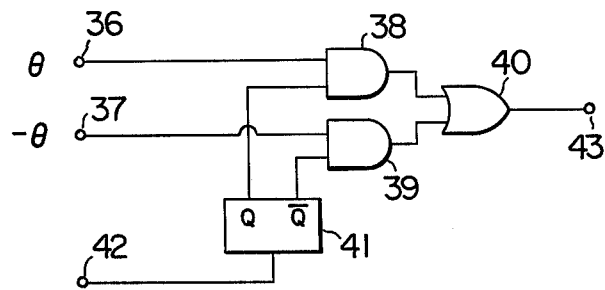
FIG. 2 is a circuit diagram illustrating a detailed configuration of a 0°/180° switching circuit in the video recording and reproducing system of FIG. 1.

The color killer circuit and the burst identification circuit which are significant portions of the present invention are now explained. In the recording mode, the output of the variable frequency oscillator (voltage controlled oscillator) 20 is passed through a 180° phase shifter (inverter) 23, the output of which is applied through a record/playback switch circuit 32 to the phase detector 24 as a reference signal thereto. In the playback mode, the output of the fixed frequency oscillator (reference oscillator) 22 is taken as a reference signal through the record/playback switch circuit 32. The reference signal is used to phase-detect the burst signal in the phase detector 24 to produce a phase detection output pulse. In response to this pulse, a pulse shaper (identification circuit) 33 produces a pulse only when the burst phase differs by 180° to detect the 180° discontinuity of the burst phase. This signal is used to control the 0°/180° switching circuit 29, which may be constructed as shown in FIG. 2, in which numeral 36 denotes a terminal to which the output of the variable frequency oscillator (voltage controlled oscillator) 28 having a phase angle $\theta$ is applied, and numeral 37 denotes a terminal to which a signal is applied the phase of which is different by 180° from that of the signal at the terminal 36, that is, $-\theta$. Numerals 38 and 39 denote AND circuits, numeral 40 denotes an OR circuit, numeral 41 denotes a flip-flop circuit, numeral 42 denotes a terminal to which the output of the pulse shaper (identification circuit) 33 is applied, and numeral 43 denotes an output terminal for the signal b.

The output pulse from the phase detector 24 is also applied to an integrator and switching circuit 34 to produce a d.c. on-off control signal which is a color killer output 35. This color killer output 35 is applied to the low-pass filters 2 and 9 and the high-pass filters 4 and 6 in the luminescence signal processing circuit and to the killer amplifiers 50A and 50B in the carrier chrominance signal processing circuit so that the band switching of the luminescence signal and the blocking of the carrier chrominance signal processing circuit are automatically carried out in a stable manner.

The operation of the present invention is explained below.

Assuming that the burst signal at the output of the burst gate circuit 17 is expressed by;

$$B_{17} = \sin(\omega_s t + \theta_1) \quad (1)$$

and the output signal of the phase shifter 19 is expressed by:

$$C_{19} = \sin(\omega_s t + \theta_2) \quad (2)$$

then, the output of the phase comparator 18 is expressed by;

$$V_D = B_{17} \cdot C_{19} = \\ \sin(\omega_s t + \theta_1)\sin(\omega_s t + \theta_2) \quad (3)$$

By resolving the equation (3) and taking a differential term, we get $$V_D = A \cos(\theta_1 - \theta_2) \quad (4)$$

where A is an amplitude term and A>0. The equation (4) can be represented by a curve shown in FIG. 3, in which an abscissa represents a phase difference $\theta_1 - \theta_2$ and an ordinate represents an error voltage $V_D/A$.

In the equation (4), when the APC circuit is in a converged condition, $$\theta_1 - \theta_2 = \pm \frac{\pi}{2} \quad (5)$$

If the input signal in the recording mode includes a $+\Delta\theta$ jitter component, the output $B_{17}$ of the burst gate 17 is expressed by;

$$B_{17} = \sin(\omega_s t + \theta_1 + \Delta\theta)$$

In order to assure that no jitter component is included in the output of the frequency converter (heterodyne circuit) 14, the output of the variable frequency oscillator (voltage controlled oscillator) 20 should be phase-shifted by $+\Delta\theta$. Assuming that $\theta_1 - \theta_2 = \pi/2$ in the equation (5), then;

$$+\Delta\theta + \theta_1 - \theta_2 = \frac{\pi}{2} + \Delta\theta > \frac{\pi}{2}$$

Figure 3:
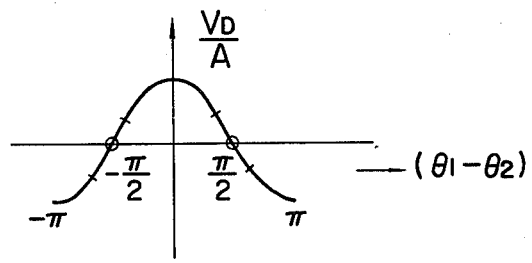
FIG. 3 shows an error voltage characteristic of a phase comparator of the video recording and reproducing system of FIG. 1.

Thus, the resulting error voltage is lower than that in the converged condition shown in FIG. 3. As seen from a voltage-to-oscillation frequency characteristic shown in FIG. 4, when the control characteristic is such that the oscillation frequency goes up as the voltage rises, that is, the gradient of the control sensitivity $\beta$ is positive, the oscillation frequency is low for a low error voltage. Accordingly, the phase angle is controlled to $-\Delta\theta$ and a desired output is not produced. Accordingly, in the recording mode, the circuit is stable when $\theta_1 - \theta_2 = -\pi/2$ rather than when $\theta_1 - \theta_2 = \pi/2$.

When $\theta_1 = 0$, then $\theta_2 = \pi/2$ and we get;

$$B_{17\ REC} = \sin \omega_s t \quad (6)$$

$$C_{19} = \sin(\omega_s t + 90°) = \cos \omega_s t \quad (7)$$

Since the phase shifter 19 is the 90° leading phase shifter, the output $C_{20}$ is a 90° lagged version of the output $C_{19}$, that is, $$C_{20} = \sin \omega_s t \quad (8)$$

When the APC circuit is in the converged condition in the recording mode, the output $V_{KR}$ of the phase detector 24 is expressed by a product of the $B_{17REC}$ in the equation (6) and a 180° phase-shifted version of the $C_{20}$, that is, $$V_{KR} = \sin \omega_s t \cdot \sin(\omega_s t + 180°) \quad (9) \\ = -B \cos 0° = -B$$

where B is an amplitude term.

When B>0, the phase detector 24 produces a negative pulse in the recording mode.

On the other hand, the frequency converter (heterodyne circuit) 14 produces the signal of the differential frequency between the frequency of the carrier a and the frequency of the low frequency-converted carrier chrominance signal, as described above. In the playback mode, when the reproduced low frequency-converted carrier chrominance signal from the low-pass filter 15 includes a $+\Delta\theta$ jitter component, a $-\Delta\theta$ jitter component, a $-\Delta\theta$ jitter component is extracted at the output of the band-pass filter 13 assuming that the phase angle of the carrier a is zero. This $-\Delta\theta$ jitter component is applied through the burst gate 17 to the phase comparator 18 and the phase detector 24. In order to eliminate the jitter component, the carrier a must include the $+\Delta\theta$ component. That is, the output of the variable frequency oscillator (voltage controlled oscillator) 20 must include the $+\Delta\theta$ component. This means that the phase (e.g. $+\Delta\theta$) of the variable frequency oscillator (voltage controlled oscillator) 20 must be controlled to be of opposite phase of the phase (e.g. $-\Delta\theta$) of the burst signal applied to the phase comparator 18, that is, in the opposite manner to that in the recording mode.

To this end, the stable point of the APC circuit is given from the equation (4) by;

$$\theta_1 - \theta_2 = +\pi/2$$

If $\theta_1 = 0$, then $\theta = -\pi/2$ and the outputs $B_{17}$ and $C_{19}$ are given by;

$$B_{17} = \sin \omega_s t \ldots \quad (10)$$

$$C_{19} = \sin(\omega_s t - 90°) = -\cos \omega_s t \ldots \quad (11)$$

The output signal of the fixed frequency oscillator (reference oscillator) 22 is a 90° lagged version of the equation (11), that is;

$$\begin{aligned} C_{22} &= -\cos(\omega_s t - 90°) \\ &= -\sin\omega_s t \end{aligned} \quad (12)$$

In the playback mode, the output $V_{KP}$ of the phase detector 24 is expressed by a product of the equations (10) and (12), that is;

$$\begin{aligned} V_{KP} &= -\sin \omega_s t \cdot \sin\omega_s t \\ &= -B \end{aligned}$$

which is identical to the equation (9). Accordingly, the color killer circuit and the burst identification circuit operate in the same manner, respectively, both in the recording mode and in the playback mode.

Figure 5:
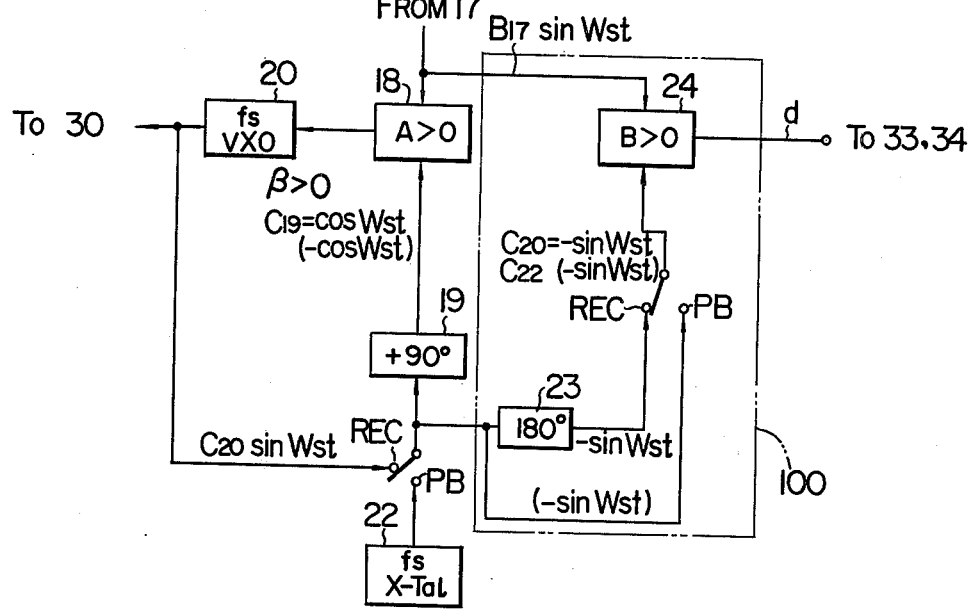
FIG. 5 shows a basic embodiment of a main part of the present invention of the video recording and reproducing system of FIG. 1 together with a phase relationship at an APC stable point.
Figures 6E, 6F:
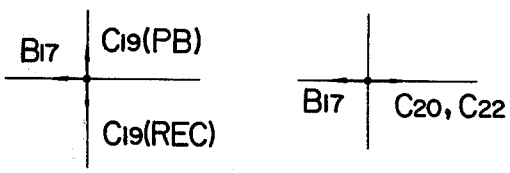
FIGS. 6e and 6f show vector diagrams at major portions in FIG. 5.

FIG. 5 shows phase conditions of major portions of the present system in which the equations (1) to (12) are applied to the APC circuit of FIG. 1 and the APC circuit is in the stable condition. In FIG. 5, assuming that the control sensitivity $\beta$ of the variable frequency oscillator (voltage controlled oscillator) 20 is positive ($\beta > 0$), the amplitude term A (in the equation (4) of the phase comparator 18 is positive ($A > 0$) and the amplitude term B (in the equation (9)) of the phase detector 24 is positive ($B > 0$), the phase relationship as illustrated is attained. The legends in the parentheses show those in the playback mode. FIG. 6 shows vector representations of the phases in the stable condition of the APC circuit. FIG. 6e shows input phases to the phase comparator 18, in which $B_{17}$ represents the phase of the burst signal, and $C_{19(REC)}$ represents the phase of the output signal of the phase shifter 19 in the recording mode. The $C_{19(REC)}$ is leading by 90° relative to the $B_{17}$. $C_{19(PB)}$ represents the phase of the output signal of the phase shifter 19 in the playback mode, which is lagging by 90° relative to $B_{17}$. FIG. 6f shows input phases to the phase detector 24, in which $B_{17}$ represents the phase of the burst signal, and $C_{20}$ and $C_{22}$ represent the phases of the carrier in the recording mode and the playback mode, respectively. They are in the same phase in the recording mode and in the playback mode and differ by 180° relative to the $B_{17}$.

Figure 7:
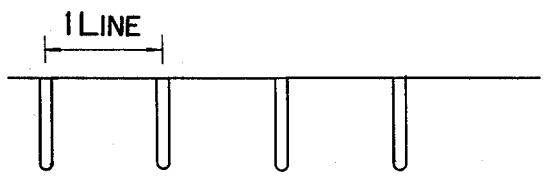
FIG. 7 shows an output waveform of a phase detector in FIG. 5.

The output d of the phase detector 24 shown in FIG. 5 is a train of negative pulses which are generated one for every horizontal scan period or every line, as shown in FIG. 7. Those negative pulses are converted to a bi-level d.c. voltage by the integrator and switching circuit 34, which is known per se to produce the color killer output 35. The switching circuit is in many cases constructed by a Schmit trigger circuit having a hysteresis characteristic.

The color killer output 35 is applied to the filters 2, 4, 6 and 9 and the killer amplifiers 50A and 50B to switch the pass band for the luminescence signal and switch the color signal processing circuit for recording and reproducing the monochromatic signal and the color signal.

The basic operation of the color killer circuit in the stable condition of the APC circuit has been described. However, if the burst signal which is 180° out of phase is received by various causes, the phase detector 24 produce a positive pulse $+B$. The identification circuit 33 functions to extract only the positive pulse to produce a phase reversal control signal (burst identification signal), which is used to invert the output of the 0°/180° switch circuit 29 to restore the original phase of the burst signal.

As described above, in the present embodiment, since the color killer circuit and the burst identification circuit are used in combination, the color killer signal and the phase reversal control signal (burst identification signal) can be produced with a simple construction.

In the embodiment shown in FIG. 1, the 180° phase shifter or inverter 23 is connected to the reference signal input terminal of the phase detector 24 so that the phase of the reference signal is switched by 180° between the recording mode and the playback mode. An alternative arrangement is shown in FIG. 8.

Figure 8:
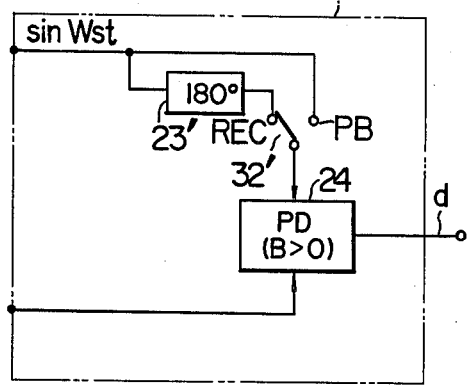
FIG. 8 shows a portion of another embodiment of the present invention.

FIG. 8 shows another embodiment of the block 100 shown in FIGS. 1 and 5, in which the 180° phase shifter or inverter 23 and the switch circuit 32 are connected to the burst signal input terminal of the phase detector 24 so that the phase of the burst signal is switched by 180° between the recording mode and the playback mode. The burst signals applied to the phase comparator 18 in the recording mode and in the playback mode are $B_{17(REC)} = \sin(\omega_s t + 180°)$ and $B_{17(PB)} = \sin \omega_s t$, respectively, and the reference signals are $C_{20(REC)} = \sin \omega_s t$ and $C_{20(PB)} = -\sin \omega_s t$, respectively (see FIG. 5). The outputs d of the phase detector 24 in the recording mode and in the playback mode, respectively, are, therefore, given by;

$$\begin{aligned} V_{KR} &= \sin(\omega_s t + 180°) \cdot \sin\omega_s t \\ &= -B \end{aligned} \quad (13)$$

$$\begin{aligned} V_{KP} &= \sin\omega_s t \cdot (-\sin \omega_s t) \\ &= -B \end{aligned} \quad (14)$$

From the equations (13) and (14), it is seen that the output d of the phase detector 24 is a negative pulse both in the recording mode and in the playback mode. If the connection of the record/playback switching terminals is reversed so that $B_{17(REC)} = \sin \omega_s t$ and $B_{17(PB)} = \sin(\omega_s t + 180°)$ are obtained, then we get;

$$V_{KR} = V_{KP} = B$$

That is, the output d of the phase detector 24 is positive. It is a matter of choice to a designer of the circuit to determine which is to be selected.

Figure 9:
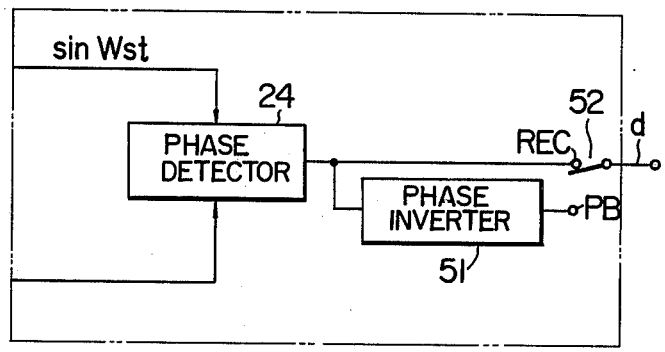
FIG. 9 shows a portion of another embodiment of the present invention.

The block 100 shown in FIG. 1 may be constructed as shown in FIG. 9, in which the 180° phase shifter or inverter 23 and the switch circuit 32 shown in FIG. 1 have been omitted and the output of the burst gate circuit 17 and the output of the variable frequency oscillator (voltage controlled oscillator) 20 or the fixed frequency oscillator (reference oscillator) 22 are directly applied to the input terminals of the phase detector 24. The output of the phase detector 24 is applied to one input terminal of a switch circuit 52 and to the other input terminal of the switch circuit 52 through an inverter 51 to produce the color killer signal d from the switch circuit 52. In this embodiment, the burst signal is $B_{17} = \sin \omega_s t$, and the reference signals in the recording mode and in the playback mode are $C_{20}(REC) = \sin \omega_s t$ and $C_{22}(PB) = -\sin \omega_s t$, respectively. Accordingly, the color killer signals in the recording mode and in the playback mode, respectively, are represented by;

$$V_{KR} = \sin \omega_s t \cdot \sin \omega_s t \quad (15)$$
$$= B$$
$$V_{KP} = \sin \omega_s t \cdot (-\sin \omega_s t) \quad (16)$$
$$= B$$

Thus, by inverting the output of the phase detector 24 by the inverter 51 in the playback mode, the color killer signal d has the same polarity in the recording mode and the playback mode and the predetermined color killer signal 35 is obtained through the integrator and switching circuit 34.

Figure 4:
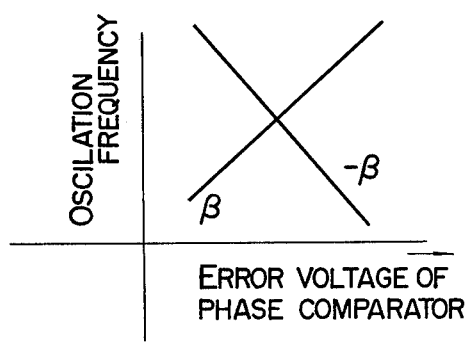
FIG. 4 illustrates a control sensitivity of a variable frequency oscillator of the video recording and reproducing system of FIG. 1.
Figure 10:
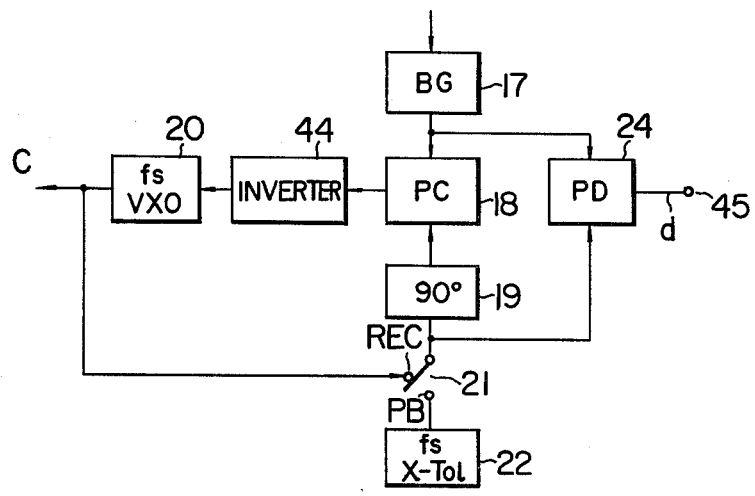
FIG. 10 shows a portion of another embodiment of the present invention.

FIG. 10 shows a further embodiment of the present invention. The like numerals to those shown in FIG. 1 designate like parts. Numerals 44 denotes an inverter which switches the control sensitivity of the variable frequency oscillator (voltage controlled oscillator) 20 in an equivalent manner between the recording mode and the playback mode. If the control sensitivity $\beta$ shown in FIG. 4 is used in the recording mode, the burst phase, the reference signal phase and the variable frequency oscillator (voltage controlled oscillator) phase are given by the equations (6), (7) and (8). The stable condition in this case is given by $\theta_1 - \theta_2 = -\pi/2$.

In the playback mode, the output of the phase comparator 18 is inverted by the inverter 44 so that the equivalent control sensitivity of the variable frequency oscillator (voltage controlled oscillator) 20 is equal to $-\beta$. Then, the circuit is stable at $\theta_1 - \theta_2 = -\pi/2$. Accordingly, the circuit has the same stable point both in the recording mode and in the playback mode and the output pulse of the phase detector 24 in the configuration of FIG. 10 also has the same polarity in the recording mode and in the playback mode.

Numeral 45 denotes an output terminal for the output d of the phase detector 24, which output signal is used for the color killer operation and the phase adjustment (burst identification) like in FIG. 1.

Instead of inserting the inverter 44 between the variable frequency oscillator (voltage controlled oscillator) 20 and the phase comparator 18 as shown in FIG. 10, it may be inserted between the burst gate circuit 17 and the phase comparator 18, between the 90° phase shifter 19 and the phase comparator 18, or between the 90° phase shifter 19 and the oscillator 20 or 22. In such a case, it should be understood that the same operation is attained because the output polarity of the phase comparator 18 is inverted between the recording mode and the playback mode. Alternatively, the amplitude term A of the phase comparator 18 may be inverted between the recording mode and the playback mode. While the 90° phase shifter 19 is inserted between the switch circuit 21 and the phase comparator 18, it should be understood that it may be inserted between the switch circuit 21 and the phase detector 24.

As described hereinabove, according to the present invention, the color killer operation in recording and reproducing the color signal is simplified by using a circuit in common to both modes and the color killer operation is reliable and is highly resistive to the noise or distortion. Further, when a high recording density is required, the burst identification circuit which detects the discontinuity of the phase of the carrier chrominance signal the phase of which changes for every line period, to compensate for the discontinuity made be used in combination with the color killer circuit.

We claim:

1. A magnetic video recording and reproducing system in which a carrier chrominance signal is frequency-converted by a signal associated with an output signal of a variable frequency oscillator, comprising:
   first phase comparator means for phase-comparing, in recording mode, a burst signal in an input video signal with the output signal of said variable frequency oscillator,
   means for controlling said variable frequency oscillator in response to an error signal produced by said first phase comparator means,
   second phase comparator means for phase-comparing, in playback mode, a burst signal in a reproduced carrier chrominance signal with an output signal of a fixed frequency oscillator,
   means for controlling said variable frequency oscillator in response to an error signal produced by said second phase comparator means,
   phase detector means having first and second inputs for comparing the phase of two signals, said inputs having a relative phase difference different from the phase difference between signals applied to said first and second phase comparator means,
   switching means for applying to said phase detector means the burst signal in the input video signal and the output signal of said variable frequency oscillator in the recording mode and the burst signal in the reproduced carrier chrominance signal and the output signal of said fixed frequency oscillator in the playback mode, and
   means for producing a color killer signal from the output of said phase detector means.

2. A magnetic video recording and reproducing system according to claim 1 wherein said first and second phase comparator means comprise a common phase comparator, and further comprising switching means for selectively applying to input terminals of said common phase comparator the output signal of said variable frequency oscillator and the burst signal in the input video signal in the recording mode and the output signal of said fixed frequency oscillator and the burst signal of the reproduced carrier chrominance signal in the playback mode.

3. A magnetic video recording and reproducing system according to claim 1 wherein said switching means includes circuit means for changing the phase of one of the two input signals to said phase detector means by 180° between the recording mode and the playback mode.

4. A magnetic video recording and reproducing system according to claim 1 wherein said means for producing the color killer signal includes circuit means for inverting the output signal of said phase detector means between the recording mode and the playback mode, and means for integrating the output of said circuit means to produce a d.c. signal.

5. A magnetic video recording and reproducing system comprising:

APC circuit means which, in recording mode phase-compares a burst signal in a video signal to be recorded with an output signal of a variable frequency oscillator by a phase comparator to produce an error signal which is used to control an oscillation frequency of said variable frequency oscillator, and, in playback mode, phase-compares a burst signal in a reproduced carrier chrominance signal with an output signal of a fixed frequency oscillator by said phase comparator to produce an error signal which is used to control the oscillation frequency of said variable frequency oscillator, frequency converter means for frequency-converting a carrier chrominance signal to a lower frequency band by a signal associated with the output signal of said variable frequency oscillator in the recording mode and frequency-converting a reproduced low frequency-converted carrier chrominance signal to the signal of the original frequency in the playback mode, phase detector means having a first and second inputs for receiving two signals, said phase detector inputs having a relative phase difference different from first and second inputs of said phase comparator, switching means for applying to said phase detector means the burst signal and the output signal of said variable frequency oscillator in the recording mode and the reproduced burst signal and the output signal of said fixed frequency oscillator in the playback mode, and means for producing a color killer signal from the output signal of said phase detector means.

6. A magnetic video recording and reproducing system according to claim 5 wherein said means for producing the color killer signal includes circuit means for inverting the output signal of said phase detector means between the recording mode of the playback mode, circuit means for integrating the output signal of said inverting circuit means, and circuit means responsive to the output signal of said integrating circuit means to produce a color killer signal of a bi-level d.c. voltage.

7. A magnetic video recording and reproducing system according to claim 5 wherein said APC circuit means includes circuit means connected between said phase comparator and said variable frequency oscillator to invert the error voltage from said phase comparator between the recording mode and the playback mode.

8. A magnetic video recording and reproducing system according to claim 5 wherein said APC circuit means includes circuit means for changing the phase of one of the two input signals to said phase comparator by 180° between the recording mode and the playback mode.

9. A magnetic video recording and reproducing system according to claim 5 wherein said switching means includes circuit means for changing the phase of one of the two input signals to said phase detector means by 180° between the recording mode and the playback mode.

10. A magnetic video recording and reproducing system according to claim 9 wherein said circuit means includes a switch having two input terminals and an output terminal connected to one of the input terminals of said phase detector means for passing one and the other of the input signals applied thereto in the recording mode and the playback mode, respectively, and a circuit for applying to one of the input terminals of said switch the output signal of said variable frequency oscillator in the recording mode and the output signal of said fixed frequency oscillator in the playback mode and applying the output signal of said variable frequency oscillator or said fixed frequency oscillator to the other input terminal of said switch through a 180° phase inverter.

11. A magnetic video recording and reproducing system according to claim 9 wherein said circuit means includes a switch having two input terminals and an output terminal connected to one of the input terminals of said phase detector means for passing one and the other of the input signals applied thereto in the recording mode and the playback mode, respectively, and a circuit for applying to one of the input terminals of said switch the burst signal in the carrier chrominance signal and the burst signal in the reproduced carrier chrominance signal in the recording mode and in the playback mode, respectively and applying the burst signal in the carrier chrominance signal or in the reproduced carrier chrominance signal to the other input terminal of said switch through a 180° phase shifter.

* * * * *